United States Patent [19]

van der Meer et al.

[11] Patent Number: 5,271,910
[45] Date of Patent: Dec. 21, 1993

[54] PROCESS OF TREATING METAL CHLORIDE WASTES

[75] Inventors: Andries P. van der Meer; Gerrit van der Lee, both of Arnhem, Netherlands

[73] Assignee: Shell Internationale Research Maatschappij B.V., Netherlands

[21] Appl. No.: 492,857

[22] Filed: Mar. 13, 1990

[30] Foreign Application Priority Data

Mar. 30, 1989 [GB] United Kingdom ............. 8907163

[51] Int. Cl.$^5$ ................. C01G 37/00; C01F 7/00
[52] U.S. Cl. ........................... 423/55; 423/62; 423/63; 423/65; 423/66; 423/68; 423/82; 423/83; 423/132; 423/147
[58] Field of Search ............. 423/83, 82, 63, 65, 423/66, 68, 55, 132, 147, 62, 1

[56] References Cited

U.S. PATENT DOCUMENTS

| | | |
|---|---|---|
| 3,016,286 | 1/1962 | Masukawa et al. ............ 423/147 |
| 3,975,495 | 8/1976 | Bowerman ................. 423/65 |
| 4,100,252 | 7/1978 | Pitts ..................... 423/82 |

FOREIGN PATENT DOCUMENTS

| | | |
|---|---|---|
| 128689 | 12/1984 | European Pat. Off. . |
| 1474152 | 5/1977 | United Kingdom . |

*Primary Examiner*—Theodore Morris

[57] ABSTRACT

A process of treating metal chloride wastes produced by chlorination of titanium ore comprises the steps of:
  (a) leaching said metal chloride wastes in a hydrochloric acid (HCl)-containing solution to obtain a solution containing solids and dissolved metals,
  (b) separating said dissolved metals from said solids present in the solution obtained in step (a) to obtain a liquid and a residue,
  (c) selectively precipitating the metals as their hydroxides by adding a neutralizing agent to the liquid obtained in step (b),
  (d) separating the precipitate of metal hydroxides obtained in step (c) from the liquid to obtain a residue, and
  (e) dewatering the residue obtained in step (d).

9 Claims, 1 Drawing Sheet

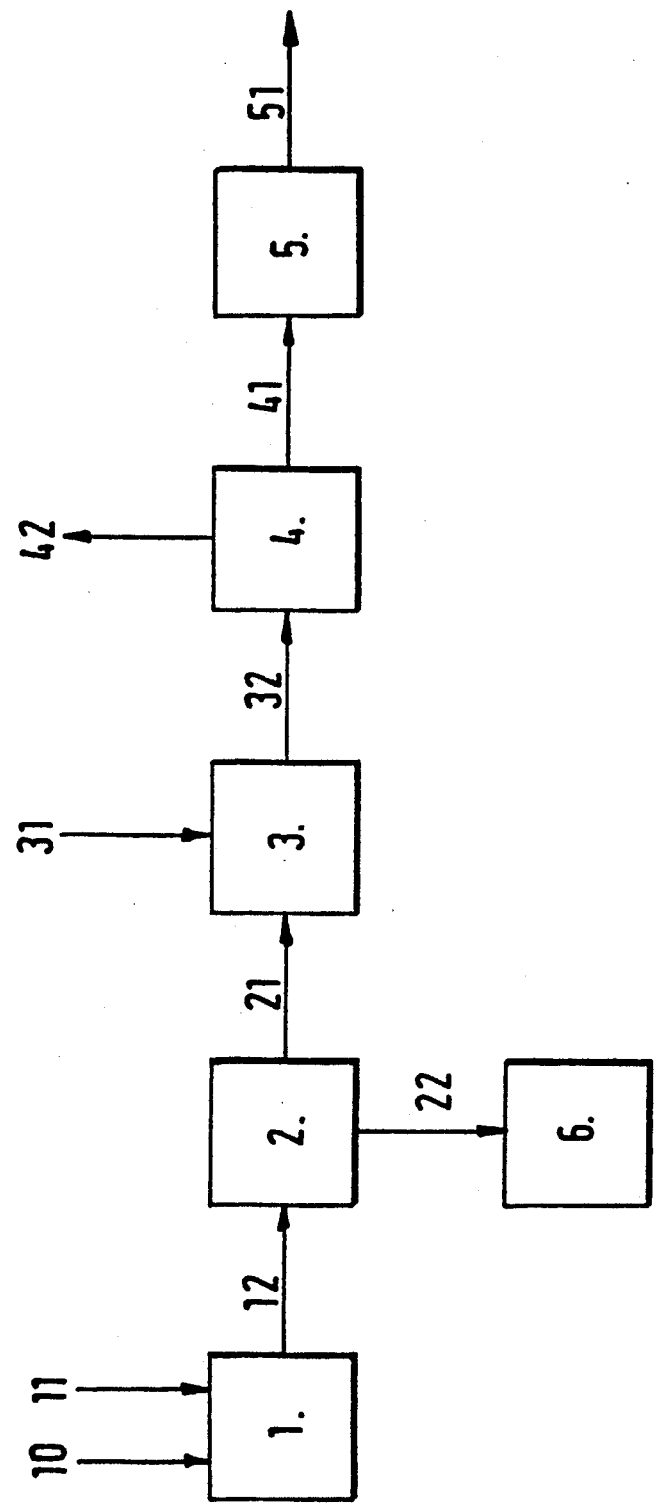

PROCESS OF TREATING METAL CHLORIDE WASTES

The present invention relates to a process of treating metal chloride wastes produced by chlorination of titanium ore.

Particularly the present invention relates to a process of treating metal chloride wastes which are produced as chlorinator blow-over from carbo-chlorination of titanium dioxide ore in a fluidized bed. Generally said chlorinator blow-over will comprise chlorides of several heavy metals such as Cr, V, Nb and Zr. Usually other metals like Al, Mn and Fe are present as well. In most practical cases iron chloride is the main metal chloride component and it is predominantly present as $FeCl_2$.

It will be clear that effluent waste streams composed as mentioned above are a serious threat to the natural environment if disposed as such. Therefore such waste streams have to be treated carefully.

In this technical field a process of treating iron chloride waste, as produced by chlorination of titanium ore, is known. Treating of said waste comprises contacting the waste with neutralizing agents such as limestone, dolomite limestone, dolomite, $CaCO_3$ or $MgCO_3$ at a relatively high temperature of more than 100° C. wherein the treatment reaction is carried out in a molten bath of $CaCl_2.xH_2O$ (x ranges from 3 to 6). Finally the resulting iron oxides are separated from the $CaCl_2.xH_2O$. Moreover a stable non-leaching material is obtained which is less water permeable than clay and can be placed in a land-fill.

However, many problems remain. As mentioned above not only iron waste could be expected. Furthermore legal land fill regulations tend to be tightened up thereby also necessitating treating processes which involve removal of several waste products.

Thus, it is an object of the invention to improve such a waste treating process, resulting in a minimal solid waste quantity by selectively concentrating said heavy metals, further to be dumped on a chemical waste site.

It is a further object of the invention to accomplish a waste treating process adapted to treat multi metal chloride wastes.

It is another object of the invention to accomplish a process of treating metal chloride wastes which can be carried out more economically in process steps which only require moderate thermal conditions.

The invention therefore provides a process of treating metal chloride wastes produced by chlorination of titanium ore, comprising the steps of:

(a) leaching said metal chloride wastes in a hydrochloric acid (HCl)-containing solution to obtain a solution containing solids and dissolved metals,
(b) separating said dissolved metals from said solids present in the solution obtained in step (a) to obtain a liquid and a residue,
(c) selectively precipitating the metals as their hydroxides by adding a neutralizing agent to the liquid obtained in step (b),
(d) separating the precipitate of metal hydroxides obtained in step (c) from the liquid to obtain a residue, and
(e) dewatering the residue obtained in step (d).

Advantageously the process step (c) in accordance with the invention is carried out at a pH in the range of from 3 to 8, particularly 3.5 to 4, at a temperature in the range of from 60° to 80° C., and by adding a lime slurry.

Furthermore it is advantageous that step (a) is carried out at a temperature in the range of from 65° to 95° C. and at a HCl-concentration in the range of from 2 to 60 g/l.

Moreover, spent scrubber liquors generated in the titanium dioxide process can be employed, i.e. spent HCl to leach the blow-over and spent lime to neutralize the leach liquor.

Another advantage lies in separating by filtrating, to be carried out respectively in step (b) and step (d). The invention further provides an additional step wherein the residue obtained in step (b) is treated, resulting in a separation of coke from ore and silica.

BRIEF DESCRIPTION OF THE DRAWING

The invention will now be described by way of example in more detail with reference to the accompanying drawing wherein the only FIGURE shows a scheme of the process in accordance with the invention.

Referring to the above FIGURE blocks 1 to 6 represent subsequent process steps as carried out in the process in accordance with the invention and arrows 10 to 51 represent streams previous or subsequent to the above steps.

Prior to the process of treating metal chloride wastes in accordance with the invention titanium ore is carbochlorinated in a fluidized bed with coke and chlorine to give $TiCl_4$:

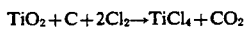
$$TiO_2 + C + 2Cl_2 \rightarrow TiCl_4 + CO_2$$

Most impurities in the ore are also chlorinated to a large extent. In the second stage $TiCl_4$, after purification, is oxidized with oxygen to give raw $TiO_2$ and chlorine:

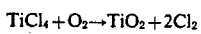
$$TiCl_4 + O_2 \rightarrow TiO_2 + 2Cl_2$$

The main waste stream to be treated is the so-called blow-over from the chlorinator, which contains fine ore (mainly $TiO_2$ and $SiO_2$), coke and condensed impurity metal chlorides. Iron is the main impurity, but heavy metals such as chromium, vanadium, niobium and zirconium are also present to a significant extent.

In accordance with the invention said waste stream together with a hydrochloric acid solution stream, respectively referenced by arrows 10 and 11 in the FIGURE, are supplied to a tank for leaching said waste stream in a leaching step (a) schematically shown by block 1 in the FIGURE. Thereby a solution containing solids and dissolved metals is obtained. It has appeared that a solution well adapted for further treatment is obtained when the chlorinator blow over waste stream and said hydrochloric acid solution both at their own temperatures are joined, thereby quenching said waste stream 10 resulting in a temperature equilibrium regime, and eliminating the need for cooling or heating. In said step (a) substantially all metal compounds are leached.

In an alternative embodiment instead of said hydrochloric acid (HCl)-containing solution spent scrubber liquor might be used advantageously, both saving on fresh hydrochloric acid and further treating an additional waste stream generated in the $TiO_2$-production, containing heavy metals.

The solution obtained in the above step (a) is supplied to a solid/liquid separator, e.g. a filter arrangement, as indicated by an arrow 12. The next step (b), represented by block 2 in the FIGURE, consequently comprises separating said dissolved metals from solids, present in the said solution, resulting in a separated liquid stream 21 and a residue stream 22.

Said stream 21 is an acidic solution of the above metals while the solid residue stream 22 comprising coke, ore and silica can be further treated in a step represented by means of block 6.

Next said liquid stream 21 is subjected to a step (c) for precipitating the plurality of the said metals which had been dissolved by adding a neutralizing agent to said acidic solution from step (b), said step (c) being represented by means of block 3 in the FIGURE.

Particularly in step (c) a basic slurry or solution 31, e.g. lime slurry is added to said liquid stream 21. The slurry advantageously comprises quicklime resulting ultimately in neutralizing all free HCl. Thereby a precipitation of the bulk of the metals in the form of hydroxides of said metals is obtained. Particularly joining of the lime stream 31 and the liquid stream 21 in a solution with predetermined pH-value has resulted in well filterable precipitates 32.

After the separation from the liquid said precipitate stream 32 is processed in a next step (d) represented by block 4 in the FIGURE. Step (d) results on the one side in an effluent stream 42, comprising i.a. Ca, Mg and Mn salts and a portion of the iron content (as Fe(II)) originally present in the ore to be treated, and on the other side in a solid material 41, e.g. obtained as a filter cake if step (d) is a filtrating process. Said cake 41 is dewatered in a next step (e) and the dewatered residue stream could be stored for example in a chemical waste dump. Step (e) and said residue stream are represented in the FIGURE as block 5 and stream 51.

In a further embodiment of the above waste treatment process both separation steps (b) and (d) can be supplied with washing operations, thereby respectively further separating leavings of solid coke, ore and silica compounds, and further separating earthalkaline and manganese compounds.

To further elucidate the above processes three examples will be shown, which result from bench scale experiments.

EXAMPLE 1

In example 1 results are shown which illustrate the leach efficiency of an exemplifying hydrochloric acid solution. In Table I analysis results of leach step (a) are shown for a waste sample containing pro rate a great amount of titanium ore. In this case stream 11, usually being a continuous spent liquor, was a 50 g/l HCl solution. A leaching period of 1 hour and an operating temperature of 80° C. were used, the latter being a suitable average resulting from joining the high temperature blow-over and the supplied HCl solution with respective solid/liquid ratio of 1:4 (m/m) in a 0.5 l reaction vessel.

TABLE I

| component | blow-over feed % (m/m) | residue % (m/m) | solution % (m/m) |
|---|---|---|---|
| Al | 1.01 | 0.11 | 93 |
| C | 19.40 | 31.30 | −7 |
| Cl | 18.10 | 0.07 | 100 |
| Cr | 0.88 | 0.21 | 84 |
| Fe | 8.60 | 0.01 | 100 |
| Mg | 0.38 | 0.06 | 89 |
| Mn | 0.09 | 0.01 | 94 |
| Nb | 0.38 | 0.26 | 55 |
| $SiO_2$ | 2.50 | 3.60 | 5 |
| $TiO_2$ | 40.20 | 63.00 | −4 |
| V | 0.33 | 0.03 | 94 |
| Zr | 0.74 | 0.23 | 79 |

The above results clearly show that coke, ore and silica were not leached at all. It has to be noticed that the negative numbers are due to calibration and accuracy effects in the sampling and measurement practice as employed. The dissolution of Al, Cr, Fe, Mg, Mn and V can be considered as complete or almost complete, while Nb and Zr were not entirely leached.

EXAMPLE 2

In example 2 results are shown which illustrate the precipitation efficiency as resulting from step (c). Table II gives the chemical composition of two samples used which represent usual chloride solutions, as obtained by chlorinating a synthetic rutile containing 92.5% $TiO_2$ and a natural rutile containing 95.2% $TiO_2$. A 12% (m/m) quicklime stream, a pH-value of 3.75, an operating temperature of 70° C. and a residence time of 1 hour were used in a 10 continuous stirred tank reactor (CSTR). As a detail it may be noticed that 80% of the iron was added as Fe(II) and that the dilution factor caused by the lime addition was 0.73.

TABLE II

| | leach liquor from 92.5% (m/m) $TiO_2$ feedstock | | | leach liquor from 95.2% (m/m) $TiO_2$ feedstock | | |
|---|---|---|---|---|---|---|
| Component | Feed applied g/l | Filtrate g/l | Removal eff. % (m/m) | Feed applied g/l | Filtrate g/l | Removal eff. % (m/m) |
| Al | 2.6 | 0.007 | 99.6 | 1.62 | 0.008 | 99.3 |
| Ca | 0.176 | 22 | — | 0.21 | 22 | — |
| Cr | 0.33 | <0.002 | >99.2 | 0.56 | <0.002 | >99.5 |
| Fe | 11.4 | 5.1 | 38.7 | 3.1 | 0.79 | 64.9 |
| Mg | 0.79 | 0.73 | — | 0.01 | 0.141 | — |
| Mn | 3.8 | 2.7 | 2.7 | 0.192 | 0.13 | 6.6 |
| Ti | 0.60 | 0.001 | 99.7 | 0.72 | <0.001 | >99.8 |
| V | 0.48 | <0.001 | >99.7 | 1.46 | 0.001 | 99.9 |
| Zr | 0.68 | <0.0005 | >99.9 | 3.4 | <0.0005 | >99.9 |
| Nb | 0.66 | <0.0005 | >99.9 | 1.50 | <0.0005 | >99.9 |

The above results clearly show a selective removal of the vast majority of in particular the heavy waste metals Cr, V, Nb and Zr as present in the blow-over waste stream.

EXAMPLE 3

In example 3 results are shown which illustrate another aspect of the precipitating efficiency as resulting from step (c) for the case the precipitate is filtrated. In Table III metal removal efficiencies are compared for filtrates obtained from solutions treated at different pH-values. The starting chloride solutions as used were obtained from a 92.0% (m/m) $TiO_2$-ore with 80% of the iron added as Fe(II). Step (c) was carried out at an operating temperature of 70° C. over an average residence time of 0.5 hour and pH control with a 12% (m/m) quicklime slurry. The experiments were carried out in a 0.5 l CSTR.

TABLE III

| Component | Feed g/l | Filtrate pH 3.0 g/l | Filtrate pH 3.5 g/l | Filtrate pH 4.0 g/l | Filtrate pH 7.0 g/l |
|---|---|---|---|---|---|
| Al | 3.8 | 0.67 | 0.017 | 0.007 | 0.02 |
| Ca | 10.5 | 40 | 30 | 30 | 34 |
| Cr | 0.32 | 0.013 | <0.002 | <0.002 | <0.002 |
| Fe tot. | 14.3 | 10.0 | 5.0 | 4.2 | <0.002 |
| $Fe^{2+}$ | 10.4 | n.a.* | 5.2 | 4.9 | <0.05 |
| Mg | 0.87 | 1.05 | 0.74 | 0.75 | 0.01 |
| Mn | 4.4 | 4.4 | 3.0 | 3.0 | 0.0031 |
| Ti | 0.46 | 0.002 | <0.0007 | <0.0007 | <0.0007 |
| V | 0.63 | 0.003 | <0.0008 | <0.0008 | <0.0008 |
| Zr | 0.68 | 0.004 | <0.0005 | <0.0005 | <0.0005 |
| Nb | 1.11 | 0.004 | <0.0005 | <0.0005 | <0.0005 |

*not analysed

The above results show filtrates containing less heavy metals at increasing pH-values. In accordance with example 2 the majority of the heavy waste metals is separated from the waste stream as produced by chlorination of the above-mentioned titanium ore.

From the above findings it can be concluded that for satisfactory treatment of said metal wastes optimal conditions and operating ranges for the subsequent steps have to be selected as disclosed above. The above examples reveal that step (a) is carried out advantageously at a temperature of 80° C. in a 50 g/l HCl solution comprising 20% (m/m) solids. The crucial precipitation in step (c) is carried out advantageously by adding a 12% (m/m) quicklime stream at pH-values between 3.5 and 4 and a temperature of 70° C. The residence times as disclosed are only indicative since the process in accordance with the invention is carried out continuously.

In a further embodiment the said solid residue stream 22, comprising mainly coke and ore, and in the remaining part a minor portion of silica, is treated further in a flotation step carried out in flotation cells having volumes up to 2.5 l. By conventionally using a frother component and diesel oil as collector in a slightly acidic pulp feed containing said ingredients, a coke concentrate can be floated off thereby separating and recovering substantially all the coke.

It will be clear to skilled persons that in the case of the filtration in step (d) the previous neutralization has to involve the creation of a precipitate with a good filterability. Besides the selection of the advantageous pH-values also settling rates are of great importance.

Moreover an additional washing step included in step (b) and/or step (d) could further improve the overall removal results and concentration of metals in the final residue.

Various modifications of the present invention will become apparent to those skilled in the art from the foregoing description and accompanying drawing. Such modifications are intended to fall within the scope of the appended claims.

We claim:

1. A process for treating metal chloride wastes produced by chlorination of titanium ore, said process comprising the steps of:
   (a) leaching said metal chloride wastes with a hydrochloric acid (HCl)-containing spent liquor stream to obtain a leachate solution containing solids and dissolved metal compounds, said leaching carried out at a temperature in the range of from 65° to 95° C. resulting from the combining of said stream and said solution wastes;
   (b) separating said dissolved metal compounds from said solids present in the solution obtained in step (a) to obtain a liquid containing said dissolved metal compounds and a first solids-containing residue;
   (c) selectively precipitating at least all heavy metals present in said dissolved metal compounds as the corresponding metal hydroxides at a pH of from 3.5 to 4.0 and at a temperature of from 60° to 80° C. resulting from the addition of a lime slurry as a neutralizing agent to the liquid obtained in step (b);
   (d) separating the thus-formed precipitate of metal hydroxides obtained in step (c) from the liquid to obtain a second solids-containing residue, and
   (e) dewatering said second solids-containing residue obtained in step (d).

2. The process as claimed in claim 1 wherein the neutralization in step (c) is carried out by adding a lime slurry.

3. The process as claimed in claim 1 wherein step (a) is carried out at a HCl-concentration in the range of from 2 to 60 g/l.

4. The process as claimed in claim 1 wherein step (a) is carried out in a spent liquor comprising solids in a range of from 4 to 30% (m/m).

5. The process as claimed in claim 1 wherein the separation in step (b) is carried out by filtration.

6. The process as claimed in claim 1 wherein the separation in step (d) is carried out by filtration.

7. The process as claimed in claim 1 wherein the dewatering of step (e) is carried out by evaporation.

8. The process as claimed in claim 1 wherein the dewatering in step (e) is carried out by calcination.

9. The process as claimed in claim 1 wherein the residue obtained in step (b) is treated for separation of coke from ore and silica.

* * * * *